US007679350B2

(12) United States Patent
Falvey et al.

(10) Patent No.: US 7,679,350 B2
(45) Date of Patent: Mar. 16, 2010

(54) DC/DC VOLTAGE REGULATOR WITH AUTOMATIC CURRENT SENSING SELECTABILITY FOR LINEAR AND SWITCH MODE OPERATION UTILIZING A SINGLE VOLTAGE REFERENCE

(75) Inventors: Christopher T. Falvey, Fremont, CA (US); Andrew Wu, Campbell, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 267 days.

(21) Appl. No.: 10/587,785

(22) PCT Filed: Feb. 5, 2004

(86) PCT No.: PCT/US2004/003267

§ 371 (c)(1),
(2), (4) Date: Jun. 4, 2007

(87) PCT Pub. No.: WO2005/085969

PCT Pub. Date: Sep. 5, 2005

(65) Prior Publication Data

US 2007/0279024 A1    Dec. 6, 2007

(51) Int. Cl.
*G05F 1/618* (2006.01)
(52) U.S. Cl. .................. 323/284; 323/224
(58) Field of Classification Search ................ 323/224, 323/266, 268, 282–290
See application file for complete search history.

(56) References Cited

U.S. PATENT DOCUMENTS 6,229,289 B1 * 5/2001 Piovaccari et al. .......... 323/268
6,522,116 B1 * 2/2003 Jordan ........................ 323/288

OTHER PUBLICATIONS

PCT International Search Report, International Application No. PCT/US04/3267, Nov. 10, 2004, 3 pages.

* cited by examiner

*Primary Examiner*—Rajnikant B Patel
(74) *Attorney, Agent, or Firm*—Perkins Coie LLP

(57) ABSTRACT

A switch-mode DC/DC converter (101) and linear low drop out (LIDO) DC/DC regulator (105) are connected in parallel to drive a single load Both regulators share a common voltage reference, feedback network (103), input supply and output such that the regulated voltage is identical during each mode of operation. During heavy loads the switch-mode regulator (107) is in operation and the linear regulator is disabled for the highest efficiency possible. Conversely at light loads the linear regulator is in operation with the switch-mode regulator (107) disabled, also maximizing the efficiency. Each regulator senses load current (131) to automatically transition between the appropriate voltage regulators at fixed load current levels. The presented invention also includes a make before break transition scheme of the voltage regulators (103) to minimize the voltage transients.

11 Claims, 4 Drawing Sheets

Block diagram of complete voltage regulator system

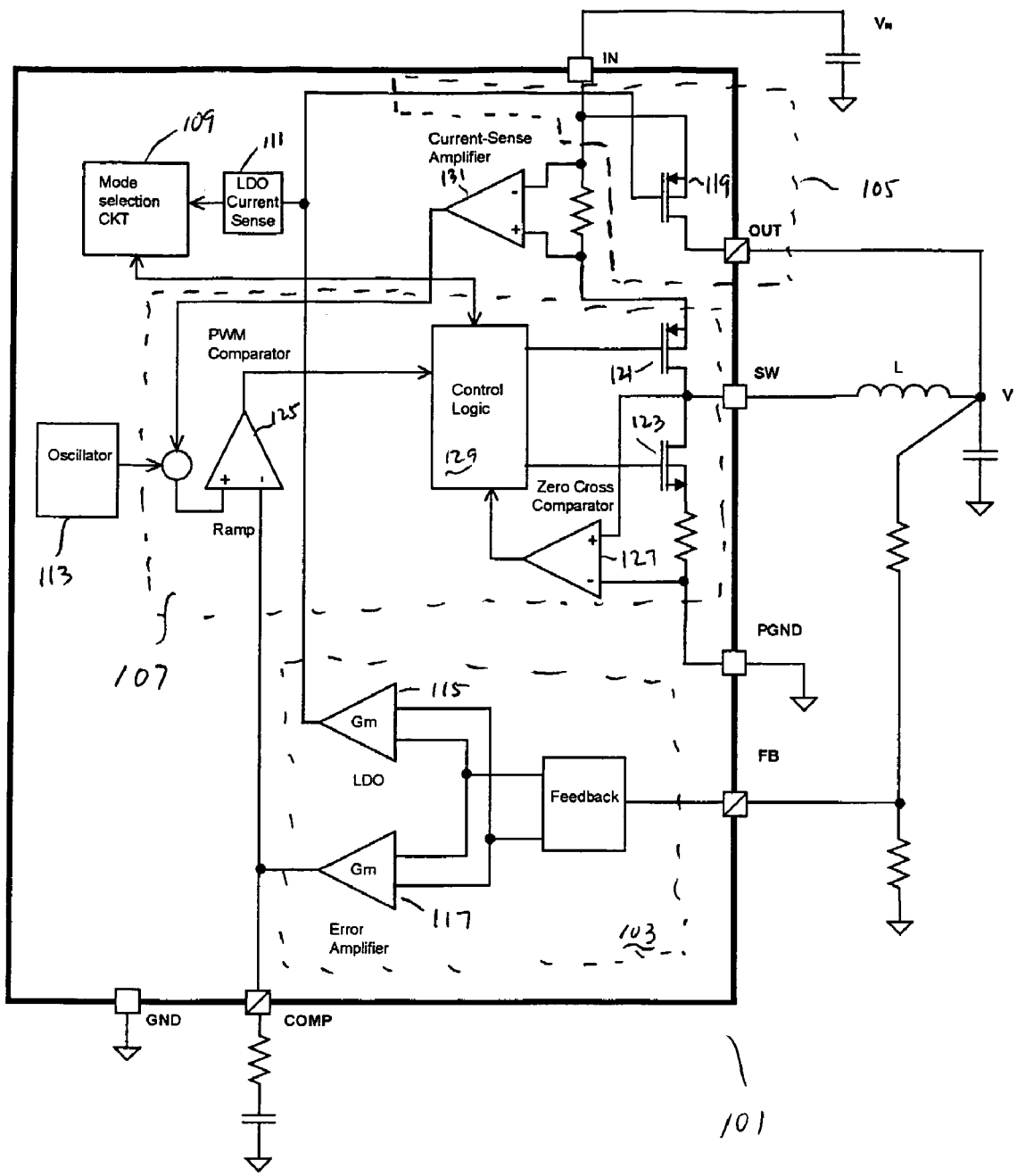
Figure 1: Block diagram of complete voltage regulator system

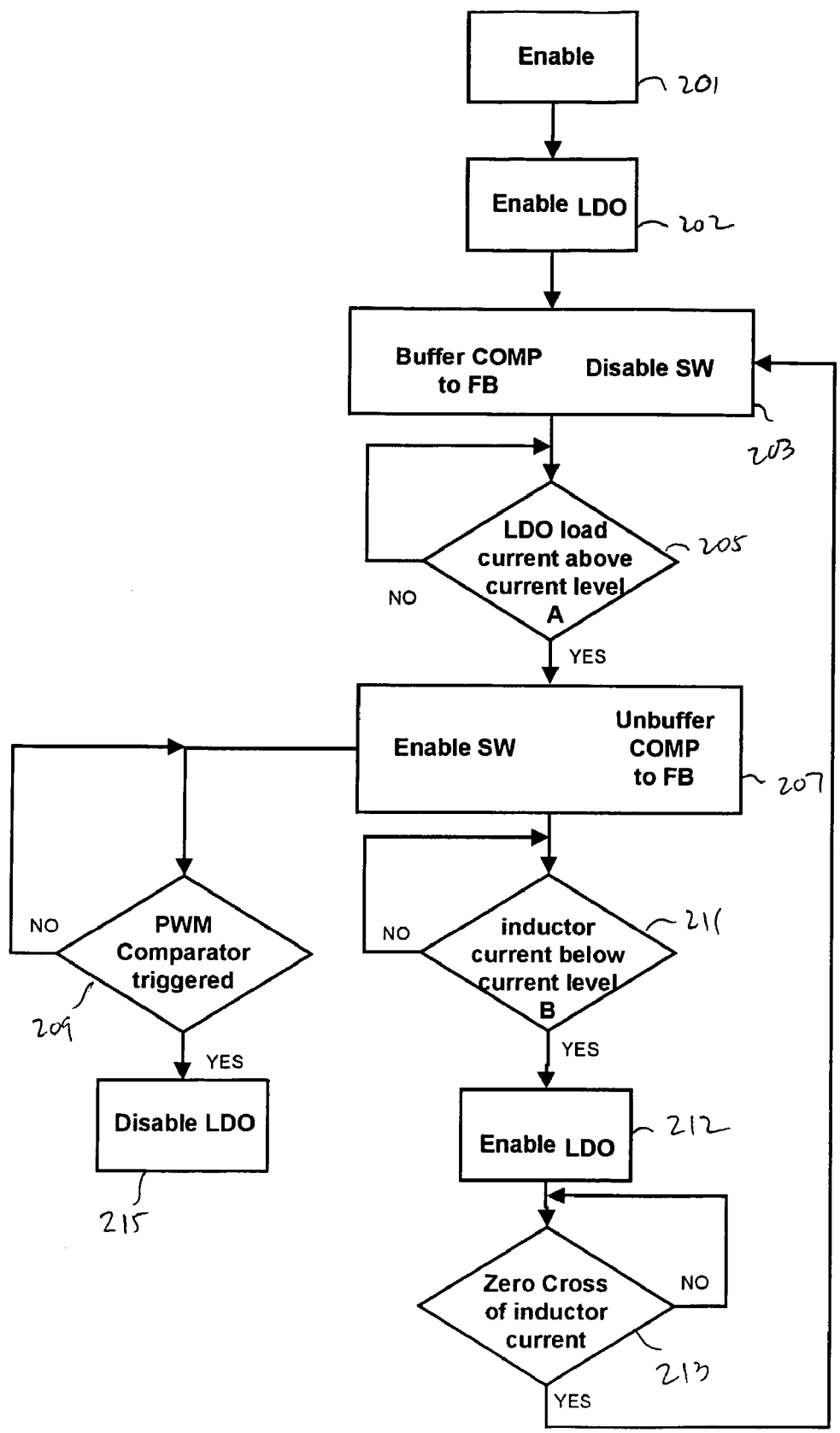
Figure 2: Control scheme of overlapped regulator selection

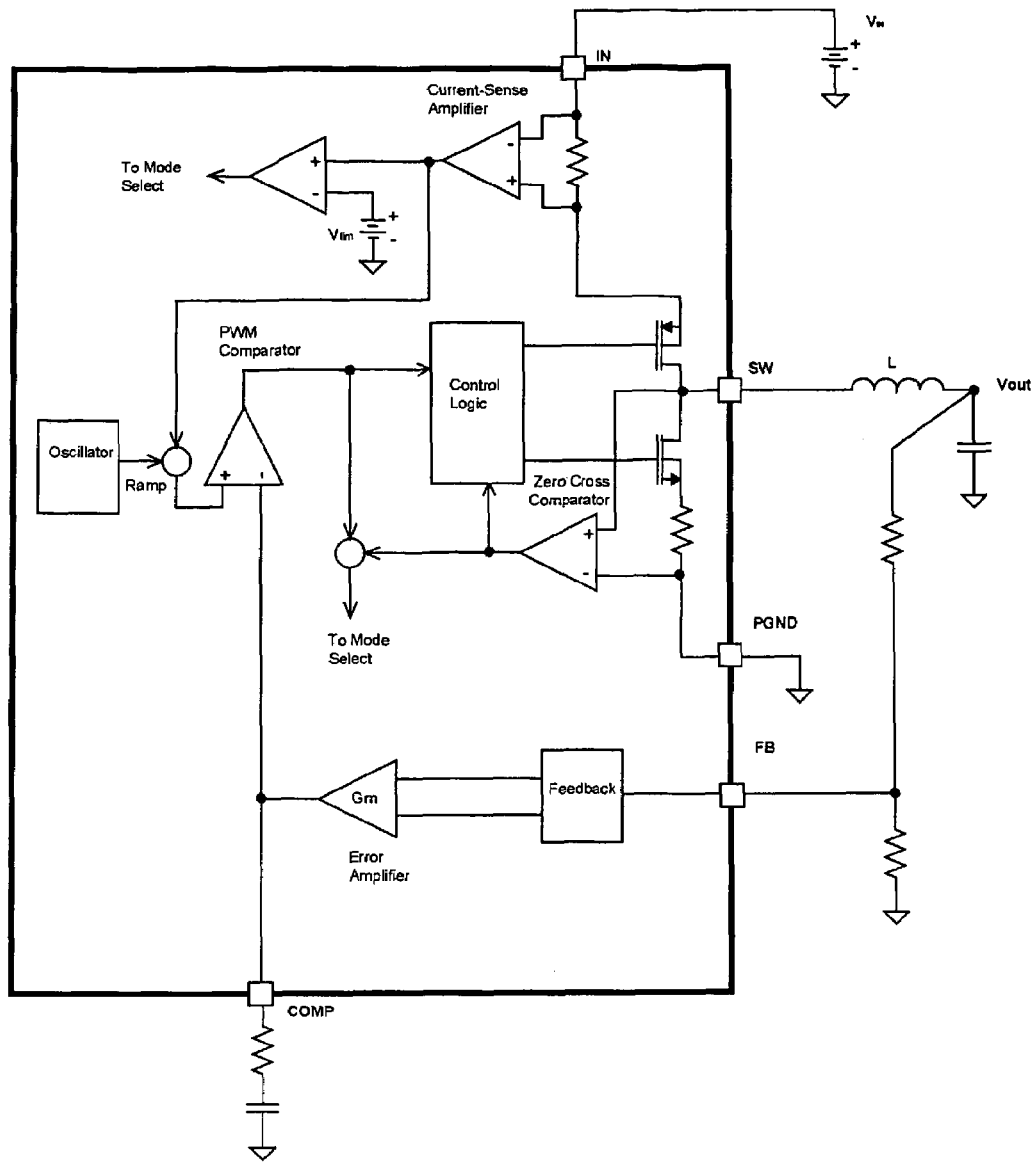
Figure 3: Block diagram of switch-mode regulator for automatic overlapping regulator selection

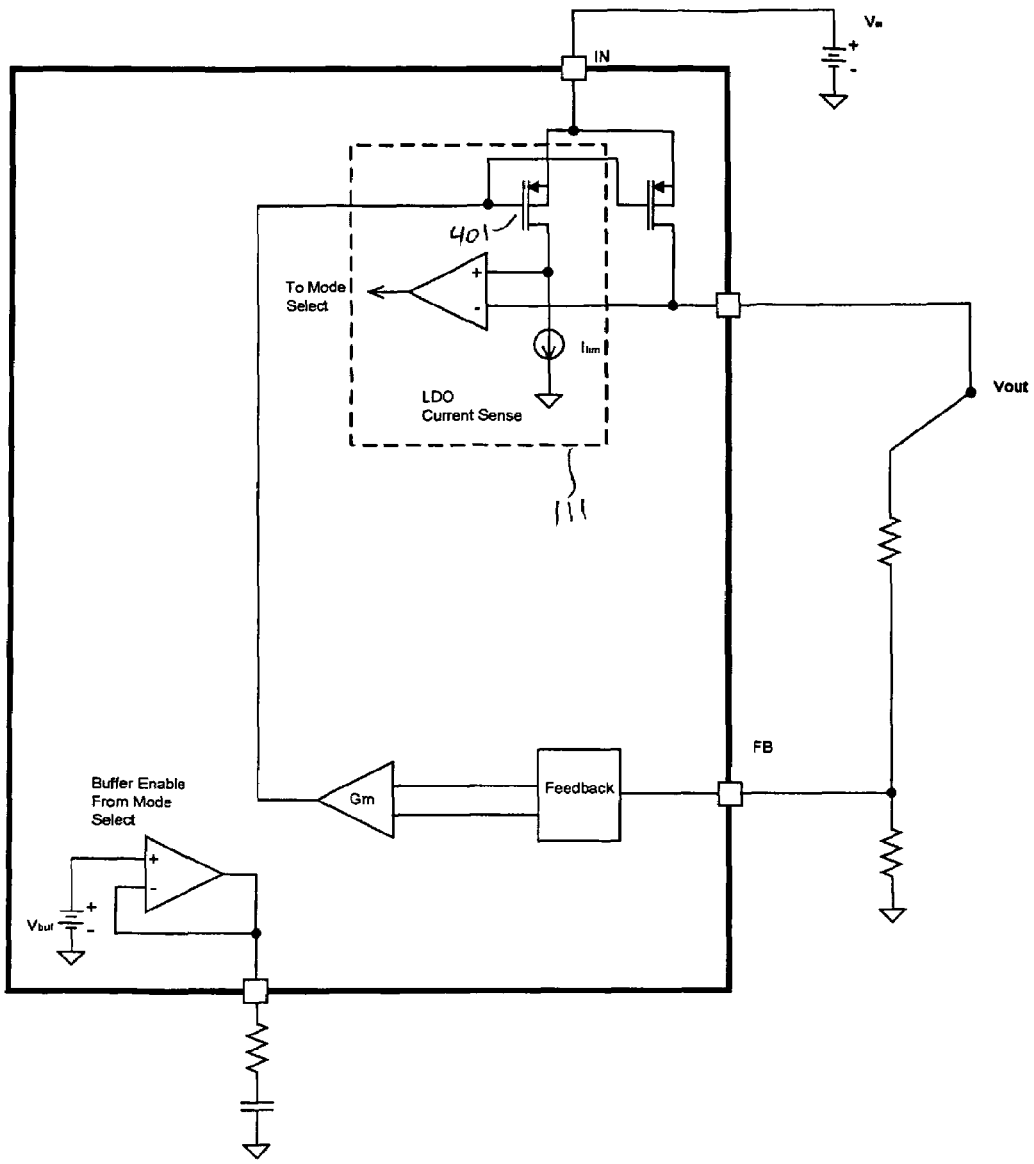
Figure 4: Block diagram of linear regulator for automatic overlapping regulator selection

DC/DC VOLTAGE REGULATOR WITH AUTOMATIC CURRENT SENSING SELECTABILITY FOR LINEAR AND SWITCH MODE OPERATION UTILIZING A SINGLE VOLTAGE REFERENCE

CROSS REFERENCE TO RELATED APPLICATIONS

This application is a US National Phase Application of PCT/U2006/003267, filed Feb. 5, 2004, to which the benefit of priority is claimed and the entirety of which is incorporated herein by reference.

TECHNICAL FIELD

This invention relates to a voltage regulator that has both a linear low drop out (LDO) regulator and a switch-mode converter, and more particularly, to a voltage regulator that can select between the LDO regulator and switch-mode converter based upon load current.

BACKGROUND

A DC/DC voltage regulator is operative to maintain a level output voltage despite variations in power supply voltage or current drawn by a load. As one example, a step down converter may take a relatively unstable input voltage and maintain a desired level output voltage that is nominally lower than the input voltage. Specifically, a step down converter may receive as an input a voltage in the range of 2-10 volts and output a level voltage of (for example) 1.8 volts.

Many portable devices require a steady voltage supply such as that provided by a DC/DC voltage regulator. Further, the advent of portable electronics and the need for longer battery life requires new types of voltage regulators. These DC/DC voltage regulators need to be efficient while operating in both low current and high current load conditions. For example, handheld electronics such as PDA's and cell phones now require high efficiency at varying loads (such as standby and active modes) to extend battery life. The standby mode requires a very low amount of current to operate. Only critical systems and volatile memory need to be powered to constantly refresh and maintain the data in the device. Because of these requirements, new voltage regulator schemes have been developed that are very efficient at all current levels.

For example, a pulse width modulated (PWM) switch-mode regulator is an efficient regulation scheme during heavy loads. It offers high efficiency, low output voltage ripple, good line and load regulation. However at light loads the PWM regulator has poor efficiency.

At light loads, a pulsed frequency modulation (PFM) switch-mode regulator is commonly used due to its high efficiency. However the large output voltage ripple, poor line and load regulation inherent to PFM precludes its use in many systems. Thus, a low quiescent current LDO regulator is desirable in these systems. The LDO regulator offers relatively good light load efficiency, low output voltage ripple, and good line and load regulation, but at heavy loads the efficiency is far below that of switching regulators.

Combining a PWM switch-mode regulator and a linear LDO regulator in parallel offers the high efficiency and good output voltage regulation required by many portable battery powered systems. Switch-mode and linear regulators have been paralleled in the prior art, but the regulation voltages have been slightly different, and the control scheme of the regulators are very basic. These types of systems do not have the optimal efficiency and the output voltage regulates at two different voltages making the load regulation poor.

BRIEF DESCRIPTION OF THE DRAWINGS

FIG. 1 illustrates a DC/DC voltage regulator formed in accordance with the present invention.

FIG. 2 is a flow diagram illustrating the control methodology for the regulator of FIG. 1.

FIG. 3 illustrates a DC/DC voltage regulator operating in switch mode.

FIG. 4 illustrates a DC/DC voltage regulator operating in linear mode.

DETAILED DESCRIPTION

This present invention discloses a DC/DC voltage regulator system that integrates both a switch-mode (PWM) regulator and a linear regulator while using a single voltage reference. Further, a control scheme is described to implement an automatic "make before break" transition between the two modes to minimize switch over transients.

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As seen in greater detail below, a linear regulator is a relatively simple implementation of a DC/DC voltage regulator where a pass device, usually a transistor, is connected between an input node and the output node. This pass device is controlled by a linear block, usually an error amplifier. The error amplifier senses the voltage at the output by way of feedback. If the voltage at the output drops, the amplifier signals the pass device to deliver more current. Likewise, if the voltage at the output increases the error amplifier signals the pass device to deliver less current.

In contrast, a switching regulator of the present invention consists of: (1) a PWM controller 129, (2) two controlled pass devices connected in series between a supply voltage and ground, (3) an inductor which is connected to the drains of the pass devices and an output node, and (4) a capacitor connected between the output node and ground and after the inductor. The capacitor side of the inductor is the filtered output node. The other side of the inductor (connected to the pass devices) switches from the supply voltage and ground (as controlled by the PWM controller). The PWM regulator in this work operates in current mode, which is described as follows.

By modulating the switching of the pass devices, the inductor will build up energy and discharge it into the capacitor and the load. The pass devices are operated in a periodic manner delivering current to the load. A control element, usually an error amplifier, compares the output voltage to an internal reference voltage and modulates the PWM signal accordingly, depending if the output voltage is higher or lower than the voltage reference.

The present invention uses these two types of voltage regulators and one feedback network to regulate a single constant voltage. The system maintains the output voltage regardless of changes in load current at the output. A current mode switching regulator is used to regulate the output during heavy loads. A linear LDO regulator is used to regulate the output during light loads. Since both of the voltage regulators utilize the same feedback network, the output voltage for all loads is regulated to the desired value no matter if the voltage regulator is in linear or switching mode.

A block diagram of the system 101 can be found in FIG. 1. The system uses an overlapping regulator selection scheme to automatically switch between the modes of operation. This selection scheme is necessary to minimize voltage excursions during load transients. A flow chart of the automatic selection scheme is seen in FIG. 2.

The system includes a feedback circuit 103, a LDO regulator 105, a PWM regulator 107, a mode selection circuit 109, a LDO current sensing circuit 111, and an oscillator 113. The LDO regulator 105 and the PWM regulator 107 operate according to the same principles already described above.

The feedback circuit includes a LDO error amplifier 115 and a PWM error amplifier 117. As described above with respect to the PWM regulator, the output pin SW of the PWM regulator 107 is connected through an inductor L in series to the output node $V_{out}$. Further, the output node is connected to ground through a capacitor. The OUT pin of the system 101 is the output from the LDO regulator 105. The OUT pin is connected directly to the output node $V_{out}$.

The feedback pin FB is used to monitor the output node $V_{out}$ through a resistive voltage divider. The voltage on feedback pin FB is provided to the feedback circuit 103. The signal is independently processed by the error amplifiers 115 and 117. These error amplifiers provide an indication to the respective LDO and PWM regulators as to the voltage on the output node $V_{out}$. Specifically, the output of the LDO error amplifier 115 is used to selectively control the LDO regulator 105 to ensure that the correct current flows through a pass device 119 of the LDO regulator 105 to ensure a stable voltage on the output node.

Thus, as seen in FIG. 1, the switch mode PWM regulator and linear regulator both use a common feedback circuit and a single voltage reference (the voltage on the feedback pin FB). The PWM regulator's error amplifier 117 is connected into the PWM comparator 125 such that the PWM regulator 107 is in current mode configuration. Because of the common feedback and voltage reference, both of the PWM and LDO regulators will output the same voltage.

The PWM generator is a current mode switching regulator that compares the inductor current with a compensation voltage that is set by the output voltage and the output load current. The PWM controller 129 regulates the load current and the output voltage via the feedback circuit 103. The PWM error amplifier 117 compares a known voltage with the output voltage. The output of the PWM error amplifier 117 is considered the compensation (COMP) node. This node is usually smoothed with external components, usually a capacitor and resistor (as seen in FIG. 1).

The current mode PWM controller 129 modulates the PWM signal by comparing the compensation node COMP to the inductor current information acquired by the current sense amplifier 131. As the output current increases, the COMP voltage also increases. The COMP node is clamped to provide a current limit for the system, such that the COMP voltage will not increase past a certain point.

The invention automatically selects between switch-mode PWM or LDO mode regulation by monitoring the load current. If a condition exists such that the switching PWM regulator 107 is turned on and the LDO regulator 103 is disabled, this means that the load current is higher than a "low current limit." The switch-mode PWM regulator 107 is thus operating in normal current mode operation. Under these conditions, the upper (high side) switch 121 is turned on cycle by cycle by a periodic signal driven in this system by the oscillator 113 and control logic 129. The compensation voltage on the COMP pin compared to the current in the inductor L, via the current sense amplifier 131, while the high side switch 121 is on. When these two voltages are equal, the loop is satisfied, the PWM comparator 125 is turned on, the upper switch is turned off 121, and the lower switch 123 is turned on, and the output voltage is in regulation.

As the current load drops below the low current limit, a signal from the low current limit is given to the selection logic 109 to turn on the LDO regulator 105. With the LDO regulator 105 turned on, current is delivered to the load by the linear pass device 119. This bypasses the inductor L and the current in the inductor L will fall to zero. When this occurs, the zero cross comparator 127 will signal to disable the switching PWM regulator 107. When the inductor current reaches zero, the PWM regulator 107 is disabled, and a buffer will charge the voltage of the compensation node COMP to a set voltage that is in the operating range of the error amplifier. This will ensure that the switching PWM regulator 107 will start in a high current state. With the PWM regulator 107 is disabled, the LDO will solely be delivering the current to the load. The block diagram for the switching regulator with low current sensing comparators is seen in FIG. 3.

The transition from low current LDO operation to high current switching regulator operation is triggered by detecting a high load current in the LDO. The LDO current sense circuit 111 will signal a high current to the mode selection circuit 109 and turn on the switching PWM regulator 107. Since the switching PWM regulator 107 will not enable instantaneously, the "buffer disable signal" is delayed a short time to allow for the switching PWM regulator 107 to power on. The loop of the switching PWM regulator 107 now tries to regulate the loop. Since the compensation node is precharged, the inductor current has to ramp up to a finite value in order to trigger the PWM comparator 125. Once this occurs the system is running and current is delivered from the switching PWM regulator 107 and the LDO regulator can be safely disabled. This minimizes voltage excursions during transitions. The high current sensing techniques and buffer can be seen in the linear regulator block diagram in FIG. 4.

Returning to FIG. 2, the process above can be seen in flow diagram form. At block 201, the regulator system 101 is enabled (turned on). In this embodiment, the default start up condition is to use the LDO regulator to supply current to the load, and thus at block 202, the LDO regulator 105 is turned on while the PWM regulator is turned off. Further, at block 203 the compensation pin COMP is buffered to the FB pin.

Note that the feedback voltage is selected for this buffered voltage so that a separate voltage source is not required and the system can run at a lower quiescent current, meaning higher efficiency at low loads. This voltage, however, may be selected at any voltage within the range of operation of the error amplifier.

Then, at block 205, the current through the LDO regulator 105 is continuously monitored to determine if it is above a predetermined threshold level (A). If the current rises above the threshold A, then at block 207, the PWM regulator 107 is enabled and the COMP pin is unbuffered to pin FB.

Next, at box 209, once the PWM comparator 125 is triggered (indicating that the PWM regulator 107 is operating correctly), at block 215, the LDO regulator 105 is disabled.

Further, at block 211, the current through the inductor L (as measured by a current sense amplifier 131) is monitored cycle by cycle while the upper FET 121 is turned on to determine if it is below a second predetermined threshold level B. If the current falls below the threshold B, then at block 212, the LDO is enabled. At block 213, the switching regulator 107 will remain on until the inductor current reaches zero, and if so, control returns to block 203. In other words, the transition from the PWM regulator 107 to the LDO regulator 105 does not occur until the inductor has reached zero.

FIG. 3 illustrates the system operating in PWM mode while FIG. 4 illustrates the system operating in LDO mode. In FIG. 4, the LDO current sense 111 includes a transistor 401. The transistor 401 has an identical gate to the output pass device 119, but with a size that is much smaller. The drain of this current sense transistor is connected to a known current source. The size of the current sense transistor is proportional to the pass transistor and the value of the current source is the same proportion to the "high current" current limit. A comparator compares the voltage at both drains and when the OUT pin drops lower than the current sense then the LDO is said to be in a high current state.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the network model described here. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein could be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the network model and its implementation may vary considerably in their implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A DC/DC voltage regulator that receives an input voltage and outputs a stable voltage onto an output node for use by a load, the regulator comprising:
    a linear regulator controlled by a linear drop out (LDO) feedback signal, said linear regulator operative if said load is drawing less than a first predetermined amount of current;
    a switch-mode regulator controlled by a switch-mode (PWM) feedback signal, said switch-mode regulator operative if said load is drawing more than a second predetermined amount of current; and
    a single feedback network that provides an output node feedback signal indicative of the voltage on said output node, said feedback network including a LDO error amplifier and a PWM error amplifier, said LDO error amplifier outputting said LDO feedback signal based upon said output node feedback signal and said PWM error amplifier outputting said PWM feedback signal based on said output node feedback signal.

2. The regulator of claim 1 wherein said first and second predetermined amounts of current are the same.

3. The regulator of claim 1 wherein said linear regulator and said PWM regulator are in parallel with each other.

4. The regulator of claim 1 further including a linear current sensor for sensing the current flowing through said linear regulator.

5. The regulator of claim 1 further including a switch-mode current sensor for sensing the current flowing through said switch-mode regulator.

6. A method of receiving an input voltage and providing a stable voltage for use by a load, the method comprising:

providing a linear regulator controlled by a linear drop out (LDO) feedback signal, said linear regulator operative if said load is drawing less than a first predetermined amount of current;

providing a switch-mode regulator controlled by a switch-mode (PWM) feedback signal, said switch-mode regulator operative if said load is drawing more than a second predetermined amount of current; and providing a single feedback network that provides an output node feedback signal indicative of the voltage on said output node, said feedback network including a LDO error amplifier and a PWM error amplifier, said LDO error amplifier outputting said LDO feedback signal based upon said output node feedback signal and said PWM error amplifier outputting said PWM feedback signal based on said output node feedback signal.

7. The method of claim 6 wherein said first and second predetermined amounts of current are the same.

8. The method of claim 6 wherein said linear regulator and said PWM regulator are in parallel with each other.

9. A method of receiving an input voltage and providing a stable voltage for use by a load, the method comprising:

using a linear regulator controlled by a linear drop out (LDO) feedback signal to provide said stable voltage to said load if said load is drawing less than a first predetermined amount of current;

using a switch-mode regulator controlled by a switch-mode (PWM) feedback signal to provide said stable voltage to said load if said load is drawing more than a second predetermined amount of current; and feeding back through a single feedback network an output node feedback signal indicative of the voltage on said output node, said feedback network including a LDO error amplifier and a PWM error amplifier, said LDO error amplifier outputting said LDO feedback signal based upon said output node feedback signal and said PWM error amplifier outputting said PWM feedback signal based on said output node feedback signal.

10. The method of claim 9 wherein said first and second predetermined amounts of current are the same.

11. The method of claim 9 wherein said linear regulator and said PWM regulator are in parallel with each other.

\* \* \* \* \*